(12) United States Patent
Allard et al.

(10) Patent No.: US 11,767,945 B2
(45) Date of Patent: *Sep. 26, 2023

(54) VACUUM INSULATED STRUCTURE WITH FILTER FEATURES IN A VACUUM CAVITY

(71) Applicant: WHIRLPOOL CORPORATION, Benton Harbor, MI (US)

(72) Inventors: Paul B. Allard, Coloma, MI (US); Sunil S. Ekshinge, Pune (IN); Sanjesh Kumar Pathak, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,665

(22) Filed: Mar. 3, 2022

(65) Prior Publication Data

US 2022/0186873 A1 Jun. 16, 2022

Related U.S. Application Data

(62) Division of application No. 16/252,900, filed on Jan. 21, 2019, now Pat. No. 11,300,238.

(51) Int. Cl.
*F16L 59/065* (2006.01)
*B01D 46/00* (2022.01)
(Continued)

(52) U.S. Cl.
CPC ........ *F16L 59/065* (2013.01); *B01D 46/0002* (2013.01); *B01D 46/0005* (2013.01);
(Continued)

(58) Field of Classification Search
CPC ....... E04B 1/803; Y02B 80/10; F25D 23/065; F25D 23/068; F25D 23/082;
(Continued)

(56) References Cited

U.S. PATENT DOCUMENTS

| 4,955,995 A | * | 9/1990 | Pontius | ................. B01D 39/00 55/467 |
| 5,252,408 A | * | 10/1993 | Bridges | ................. E04B 1/803 428/76 |

(Continued)

FOREIGN PATENT DOCUMENTS

| CN | 102116402 A | 7/2011 |
| CN | 102628539 A | 8/2012 |

(Continued)

*Primary Examiner* — Alexander S Thomas
(74) *Attorney, Agent, or Firm* — Price Heneveld LLP

(57) ABSTRACT

A vacuum insulated structure includes a first panel having an inner surface defining an area. The first panel includes a vacuum port. A trim breaker interconnects the first panel with a second panel in an air-tight manner to define a vacuum cavity therebetween. A first filter member is disposed on and substantially covers the area of the inner surface of the first panel and the vacuum port of the first panel. A second filter member substantially covers the first filter member to define a channel therebetween. The channel includes an area commensurate with the area of the inner surface of the first panel. The first panel may also include a mesh member covered by a filter member to define a channel therebetween to improve evacuation time using the channel to evacuate the vacuum cavity.

7 Claims, 6 Drawing Sheets

(51) Int. Cl.
*F25D 23/06* (2006.01)
*B32B 1/02* (2006.01)
*B01D 46/56* (2022.01)

(52) U.S. Cl.
CPC ............... *B01D 46/56* (2022.01); *B32B 1/02* (2013.01); *F25D 23/065* (2013.01); *B01D 2279/35* (2013.01); *Y10T 428/231* (2015.01)

(58) Field of Classification Search
CPC .............. F25D 23/085; B01D 46/0002; B01D 46/0005; B01D 46/0006; B01D 46/0008; B01D 46/0009
See application file for complete search history.

(56) References Cited

U.S. PATENT DOCUMENTS

| | | | |
|---|---|---|---|
| 5,500,305 | A | 3/1996 | Bridges et al. |
| 5,900,299 | A | 5/1999 | Wynne |
| 6,858,280 | B2 | 2/2005 | Allen et al. |
| 8,852,708 | B2 | 10/2014 | Kim et al. |
| 11,300,238 | B2 * | 4/2022 | Allard .................. F25D 23/065 |
| 2016/0258671 | A1 * | 9/2016 | Allard .................. F25D 23/085 |
| 2017/0327297 | A1 | 11/2017 | Hiemeyer et al. |

FOREIGN PATENT DOCUMENTS

| | | |
|---|---|---|
| CN | 103562613 A | 2/2014 |
| CN | 107461994 A | 12/2017 |
| EP | 0907863 A1 | 4/1999 |
| EP | 2462392 B1 | 5/2016 |
| GB | 1366503 | 6/1971 |
| WO | 9803298 A1 | 1/1998 |
| WO | 2014132661 A1 | 2/2017 |

* cited by examiner

VACUUM INSULATED STRUCTURE WITH FILTER FEATURES IN A VACUUM CAVITY

CROSS-REFERENCE TO RELATED APPLICATION

This application is a divisional of U.S. patent application Ser. No. 16/252,900, filed on Jan. 21, 2019, now U.S. Pat. No. 11,300,238 entitled VACUUM INSULATED STRUCTURE WITH FILTER FEATURES IN A VACUUM CAVITY, the entire disclosure of which is hereby incorporated by reference.

BACKGROUND

The present device generally relates to a vacuum insulated structure, and more specifically, to a vacuum insulated structure having a filtration and channel system for improving evacuation time in drawing a vacuum on the structure.

SUMMARY

In at least one aspect, a vacuum insulated structure includes a first panel having an inner surface and an access aperture disposed therethrough. A mesh member substantially covers the inner surface of the first panel. A filter member is disposed over the mesh member to define a channel therebetween. The channel is in fluid communication with the access aperture. A second panel is operably coupled to the first panel to define a vacuum cavity therebetween. Air can be drawn from the vacuum cavity through the filter member and through the channel to a vacuum port disposed over the access aperture.

In at least another aspect, a vacuum insulated structure includes a panel having an inner surface and a vacuum port. A mesh member includes a width defined between first and second surfaces of interconnected polymeric strands that make up the mesh member. The first surface of the mesh member is disposed on the inner surface of the panel over the vacuum port. A filter member covers the mesh member to define a channel therebetween. The channel includes a width commensurate with the width of the mesh member. An adhesive member interconnects the filter member and the inner surface of the panel.

In at least another aspect, a vacuum insulated structure includes a first panel having an inner surface defining an area. The first panel includes a vacuum port. A trim breaker interconnects the first panel with a second panel in an air-tight manner to define a vacuum cavity therebetween. A first filter member is disposed on and substantially covers the area of the inner surface of the first panel and the vacuum port of the first panel. A second filter member substantially covers the first filter member to define a channel therebetween. The channel includes an area commensurate with the area of the inner surface of the first panel.

These and other features, advantages, and objects of the present device will be further understood and appreciated by those skilled in the art upon studying the following specification, claims, and appended drawings.

DETAILED DESCRIPTION OF EMBODIMENTS

Figure 1:
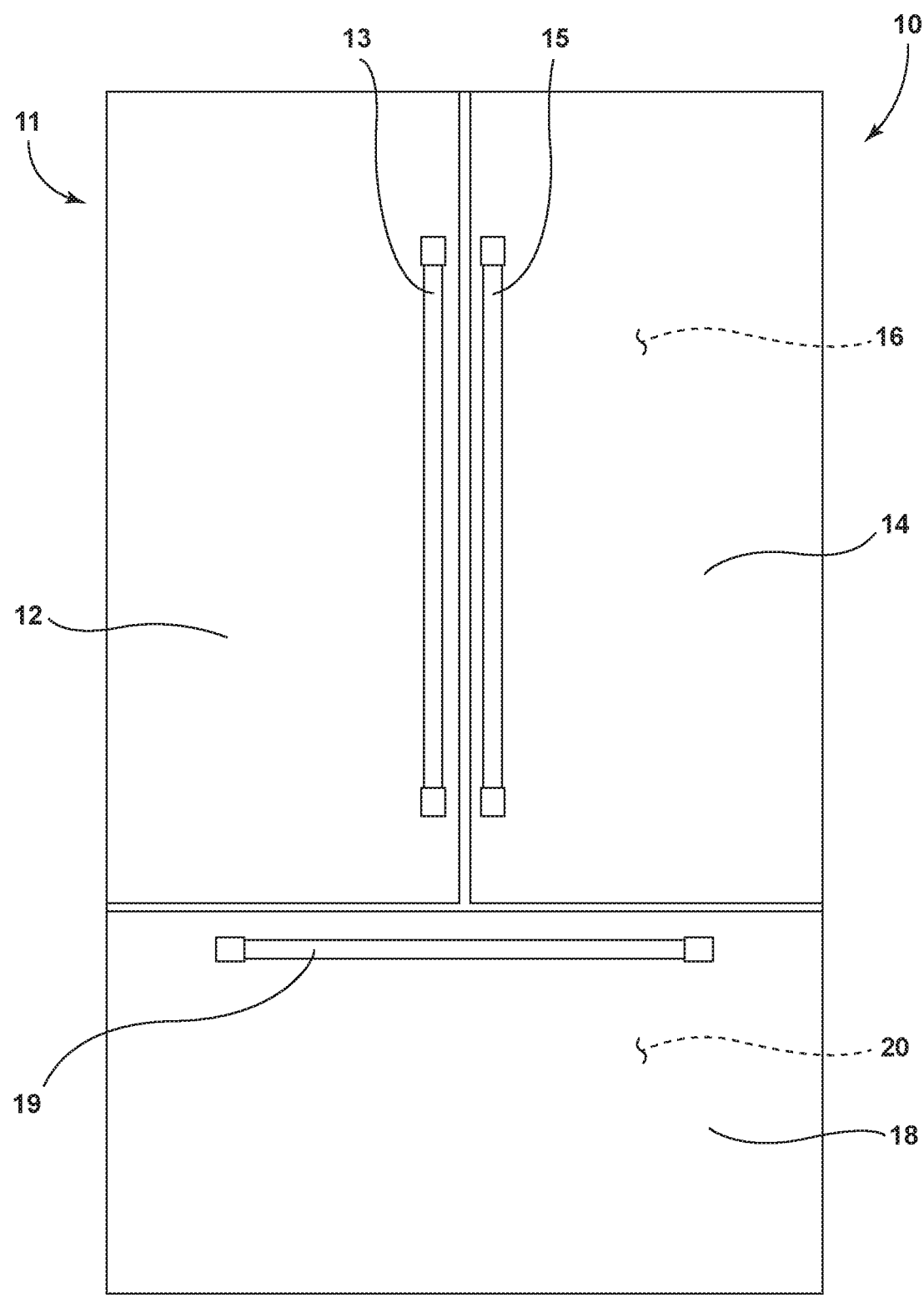
FIG. 1 is a front elevation view of an appliance for use with the present concept.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, reference numeral 10 generally designates an appliance shown in the form of a refrigerator that includes a vacuum insulated cabinet structure 11. The refrigerator 10 further includes first and second doors 12, 14 that are disposed in a French-style door configuration and are pivotally coupled to the vacuum insulated cabinet structure 11 for selectively providing access to a refrigerator compartment 16. The refrigerator 10 shown in FIG. 1 also includes a lower pull-out freezer drawer 18 having a handle 19 that selectively provides access to a freezer compartment 20. It will generally be understood that the features, as set forth herein, could be applied to any appliance having any general configuration. Further, the door configuration of the refrigerator 10 can vary from that shown in FIG. 1 to include a single door or multiple doors in other configurations. The first and second doors 12, 14 illustrated in FIG. 1 include handles 13, 15, respectively, which are configured to allow a user to selectively move the first and second doors 12, 14 between open and closed positions, either separately or together. The first and second doors 12, 14 and the freezer drawer 18 are also contemplated to be vacuum insulated structures, as further described below.

Figure 2A:
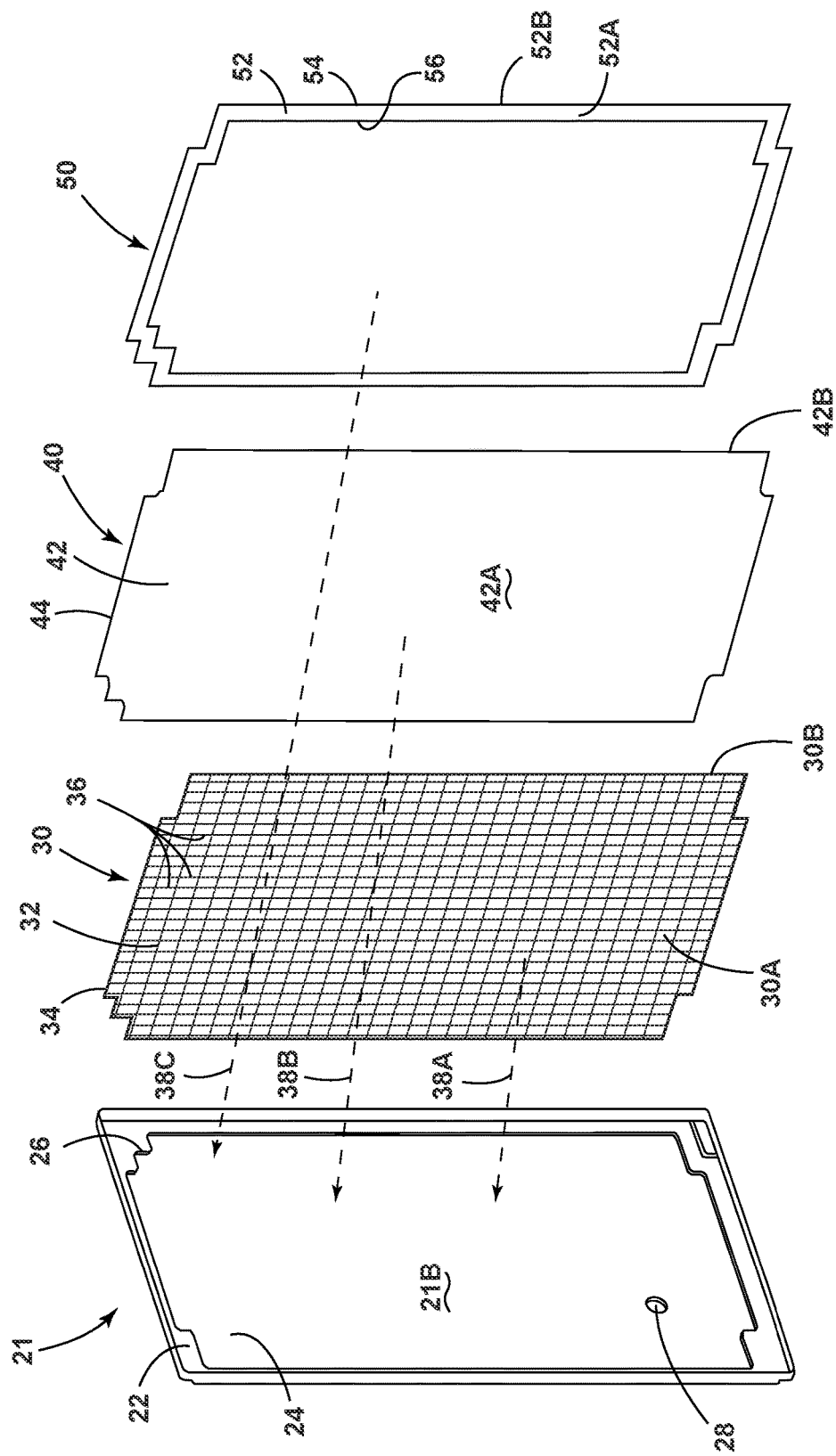
FIG. 2A is a top perspective view of a panel having a mesh member, a filter member and an adhesive member exploded away from an inner surface of the panel.
Figure 4:
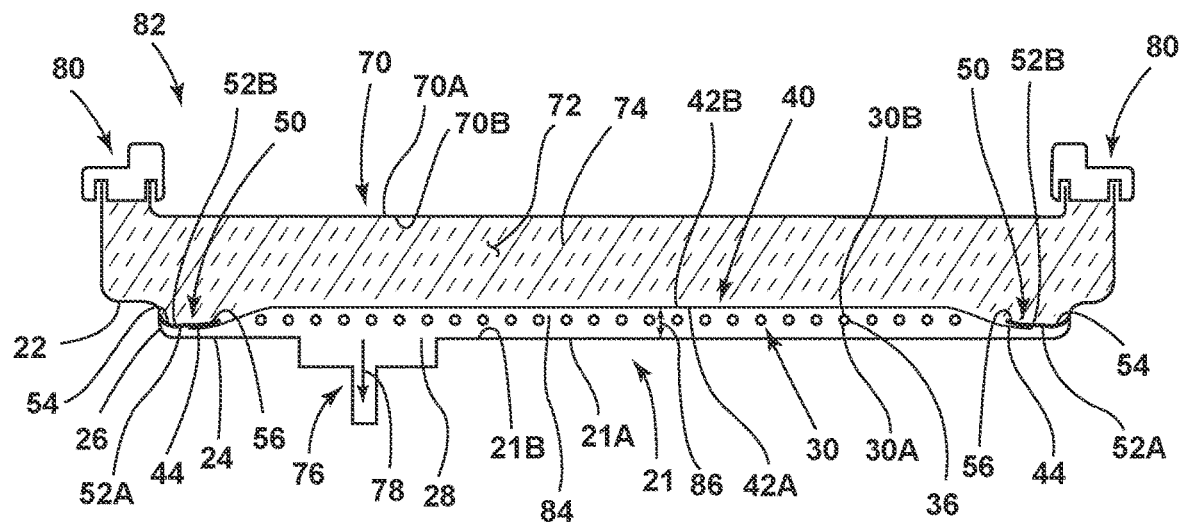
FIG. 4 is a cross sectional view of the panel of FIG. 2B taken at line IV and coupled to a second panel via a trim breaker to define a vacuum cavity therebetween.
Figure 5:
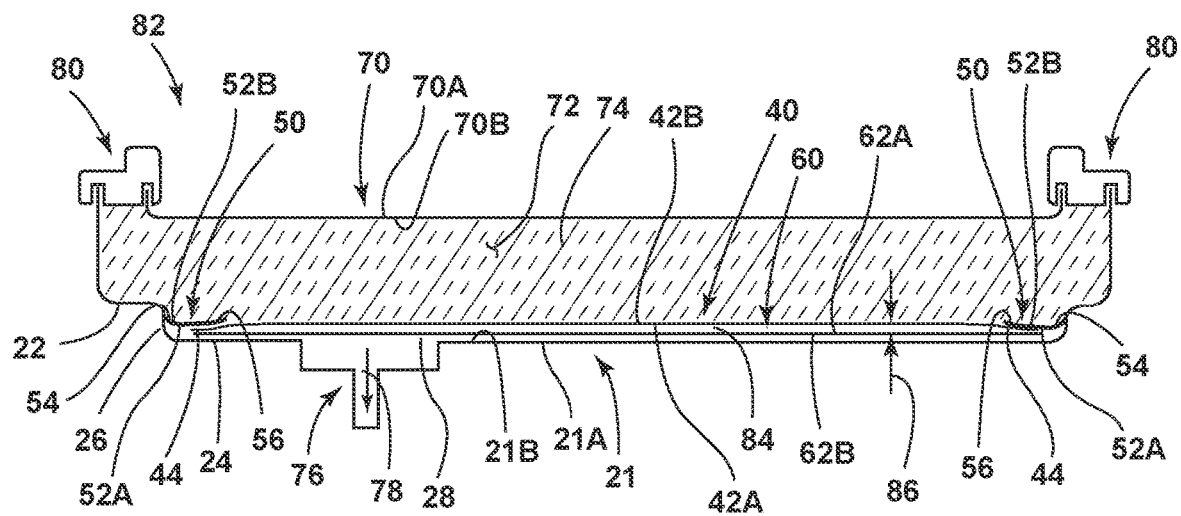
FIG. 5 is a cross sectional view of the panel of FIG. 3B taken at line V and coupled to a second panel via a trim breaker to define a vacuum cavity therebetween.

Referring now to FIG. 2A, a panel 21 is shown, wherein the panel 21 is contemplated to be part of a vacuum insulated structure, such as a part of the vacuum cabinet structure 11 (FIG. 1) or a door panel thereof. The vacuum insulated structure contemplated to include the panel 21 shown in FIG. 2A is contemplated to be a door panel. While the vacuum insulated structure, best shown in FIGS. 4 and 5, is exemplified as a vacuum insulated structure for a door, the present concept can be used with any type of vacuum insulated structure, and therefore, is not limited to use with a vacuum insulated door panel. In FIG. 2A, the panel 21 is shown from an inner surface 21B thereof. The inner surface 21B of the panel 21 defines an area substantially disposed across the entirety of the panel 21. The panel 21 further includes a first body portion 22 which surrounds a second body portion 24. In the embodiment shown in FIG. 2A, the second body portion 24 is centrally disposed and outwardly extending from the first body portion 22. Thus, the second body portion 24 defines a raised portion of the panel 21 relative to the first body portion 22. The second body portion 24 and the first body portion 22 are interconnected by an intermediate portion 26 which is best shown in FIGS. 4 and 5. With the second body portion 24 extending outwardly from the first body portion 22 by a distance defined by the intermediate portion 26, the panel 21 includes an integrated stiffener. Having an integrated stiffener in the panel 21, the panel 21 is provided with increased structural rigidity, as compared to a standard flat panel. This increased structural rigidity is apt to counter vacuum forces that act on the panel during an evacuation procedure as further described below. As further shown in FIG. 2A, the panel 21 includes an access aperture 28 disposed therethrough. In use, the access aperture 28 can be used to fill a vacuum cavity of a vacuum insulated structure with an insulating material, such as an insulating powder, and may also be used with an evacuation port to draw a vacuum on a vacuum insulated structure, as further described below. The panel 21 is contemplated to be comprised of a metal material, such as a stamped sheet metal.

Figure 2B:
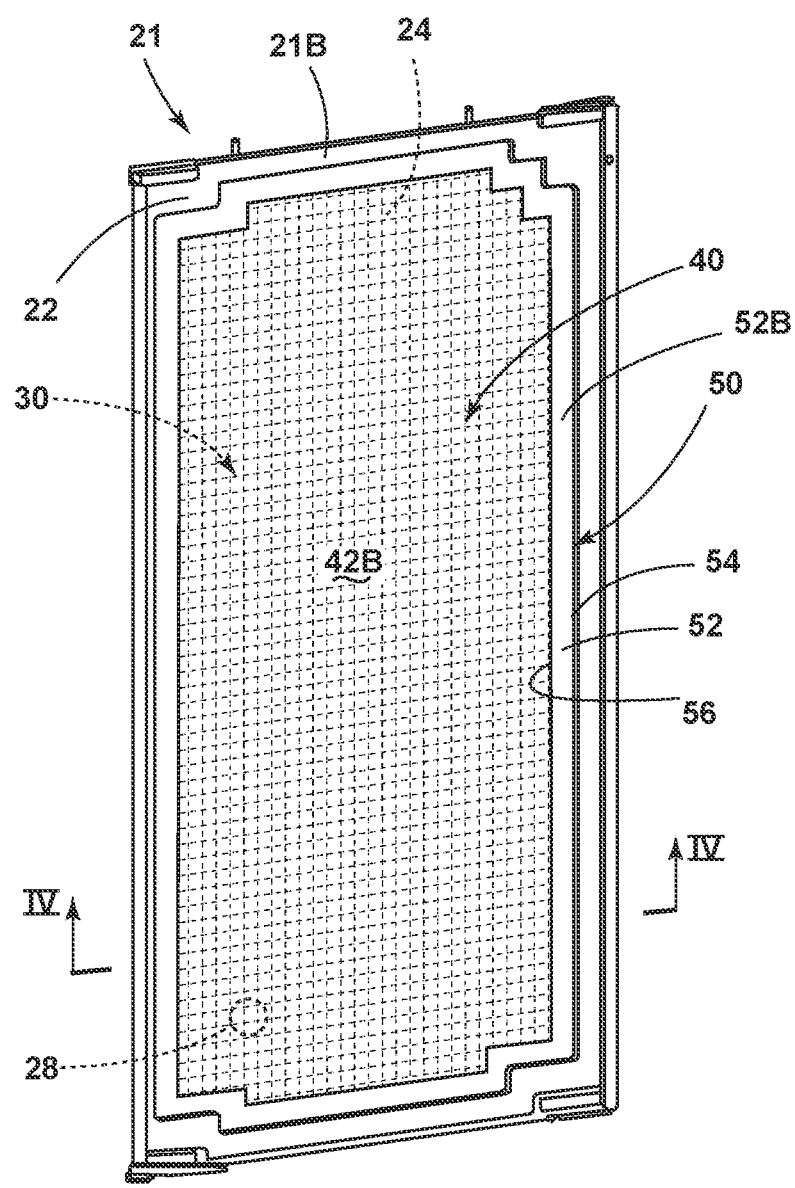
FIG. 2B is a rear perspective view of the panel of FIG. 2A having the mesh member, shown in phantom and coupled to the inner surface of the panel, with the filter member also coupled thereto by the adhesive member.

As further shown in FIG. 2A, a mesh member 30 is shown having a body portion 32 with an outer perimeter edge 34. The mesh member 30 is shown in FIG. 2A as exploded away from the inner surface 21B of the panel 21, however, it is contemplated that the mesh member 30 is affixed to the inner surface 21B of the panel 21 in assembly, as indicated by arrow 38A, and is sized appropriately to substantially cover the inner surface 21B and the access aperture 28 of the panel 21. The mesh member 30 is contemplated to be comprised of a series of interconnected polymeric strands 36 which are configured to provide a stand-off feature for a filter member 40, as further describe below. The strands 36 of the mesh member 30 collectively define first and second surfaces 30A, 30B of the mesh member 30 that are spaced-apart a distance commensurate with the girth or width of the strands 36. The mesh member 30 is specifically affixed to the inner surface 21B of the panel 21 at the first surface 30A of the mesh member 30. With reference to FIG. 2B, the mesh member 30 is shown in phantom as substantially covering the area defined by the inner surface 21B of the panel 21. As used in this context, the term "substantially" is meant to define a degree of coverage of the panel 21 by the mesh member 30 that is commensurate with the overall length and width of the panel 21 and the area defined by the inner surface 21B of the panel 21. The mesh member 30 can be affixed to the inner surface 21B of the panel 21 by adhesive, such as glue or tape, to hold the mesh member 30 in place until the mesh member 30 can be covered by a filter member 40, as further described below.

As further shown in FIG. 2A, a filter member 40 is shown having a body portion 42 with first and second sides 42A, 42B and an outer perimeter edge 44. The filter member 40 is shown in FIG. 2A as exploded away from the inner surface 21B of the panel 21, however, it is contemplated that the filter member 40 is affixed to the inner surface 21B of the panel 21 in assembly, and is sized appropriately to substantially cover the area defined by the inner surface 21B of the panel 21, as well as the access aperture 28 of the panel 21. The filter member 40 is contemplated to be comprised of a sheet of paper material which is configured to allow for the passage of air from a vacuum cavity 72 (FIG. 4) to the mesh member 30, while retaining an insulation material 74 (FIG. 4) within the vacuum cavity 72 (FIG. 4). Thus, the paper material of the filter member 40 may be a filter paper material that is porous to allow for air to be drawn therethrough, but is contemplated to include properly sized pores, such that the filter member 40 acts as a filter to prevent the insulation material 74 (FIG. 4) disposed within the vacuum cavity 72 (FIG. 4) from passing through the filter member 40 during an evacuation procedure. The paper material of the filter member 40 may be a polyester-based material. Being sized to cover the entirety of the mesh member 30, the filter member 40 substantially covers the inner surface 21B of the panel 21 in assembly, as shown in FIG. 2B. The filter member 40 is contemplated to be applied to the inner surface 21B of the panel 21 over the mesh member 30 as indicated by arrow 38B. After covering the mesh member 30, the filter member 40 is contemplated to be affixed to the inner surface 21B of the panel 21 by an adhesive member 50. The adhesive member 50 is shown in FIG. 2A as having a frame portion 52 that substantially follows the contours of the outer perimeter edge 44 of the filter member 40 and includes first and second sides 52A, 52B. The first side 52S is contemplated to be an adhesive side for coupling filter features to the inner surface 21B of the panel 21. With a frame portion 52 sized according to the outer perimeter edge 44 of the filter member 40, the adhesive member 50 can be used to interconnect the inner surface 21B of the panel 21 with the filter member 40. Thus, the frame assembly 52 of the adhesive member surrounds the outer perimeter edge 44 of the filter member 40 when applied thereto as indicated by arrow 38C. Specifically, the adhesive member 50 includes a first portion 54 which is configured to couple to the inner surface 21B of the panel 21, and a second portion 56 which is configured to adhere to the second side 42B (FIG. 4) of the filter member 40 adjacent the outer perimeter edge 44 thereof. Coupling of the filter member 40 to the panel 21 using the first and second portions 54, 56 of the adhesive member 50 is best shown in FIGS. 4 and 5. In this way, when the adhesive member 50 interconnects the filter member 40 and the inner surface 21B of the panel 21, the filter member 40 will remain in place over the mesh member 30, as best shown in FIGS. 2B and 4.

With specific reference to FIG. 2B, the panel 21 of FIG. 2A is shown in an assembled condition. With reference to FIGS. 2A and 2B, when assembling the components of the panel 21, the first surface 30A (FIG. 2A) of the mesh member 30 is positioned on the inner surface 21B of the panel 21 in a manner as indicated by arrow 38A. The mesh member 30 can then be adhered to the inner surface 21B of the panel 21 by taping portions of the mesh member 30 to the inner surface 21B of the panel 21. In coupling the mesh member 30 to the inner surface 21B of the panel 21, the mesh member 30 will fully cover the access aperture 28 of the panel 21. With the mesh member 30 in place on the inner surface 21B of the panel 21, the filter member 40 will be placed over the mesh member 30 along the path as indicated by arrow 38B, such that the first side 42A of the filter member 40 contacts and covers the second surface 30B of the mesh member 30. As noted above, the filter member 40 completely covers the mesh member 30 in assembly. Once the filter member 40 is in place on the mesh member 30, the filter member 40 is retained in place by the adhesive member 50 as shown in the direction indicated by arrow 38C. Specifically, the first side 52A of the adhesive member 50 will coupled to the second side 42B of the filter member 40. The first side 52A of the adhesive member 50 will further couple to the inner surface 21B of the panel 21 to fully interconnect the filter member 40 to the panel 21 using the adhesive member 50 extending fully around the border 44 of the filter member 40. With the filter member 40 coupled to the inner surface 21B of the panel 21, the panel 21 is fully assembled as shown in FIG. 2B and ready for incorporation into a vacuum insulated structure. In the assembled condition shown in FIG. 2B, the mesh member 30 is shown in phantom as being covered by the filter member 40. As further shown in FIG. 2B, the mesh member 30 and the filter member 40 both completely cover the access aperture 28 disposed through the panel 21. In the configuration shown in FIG. 2B, the mesh member 30 in the filter member 40 cover the second body portion 24 of the panel 21, but may cover the entire inner surface 21B of the panel 21 in other embodiments without departing from the spirit of the present concept.

Figure 3A:
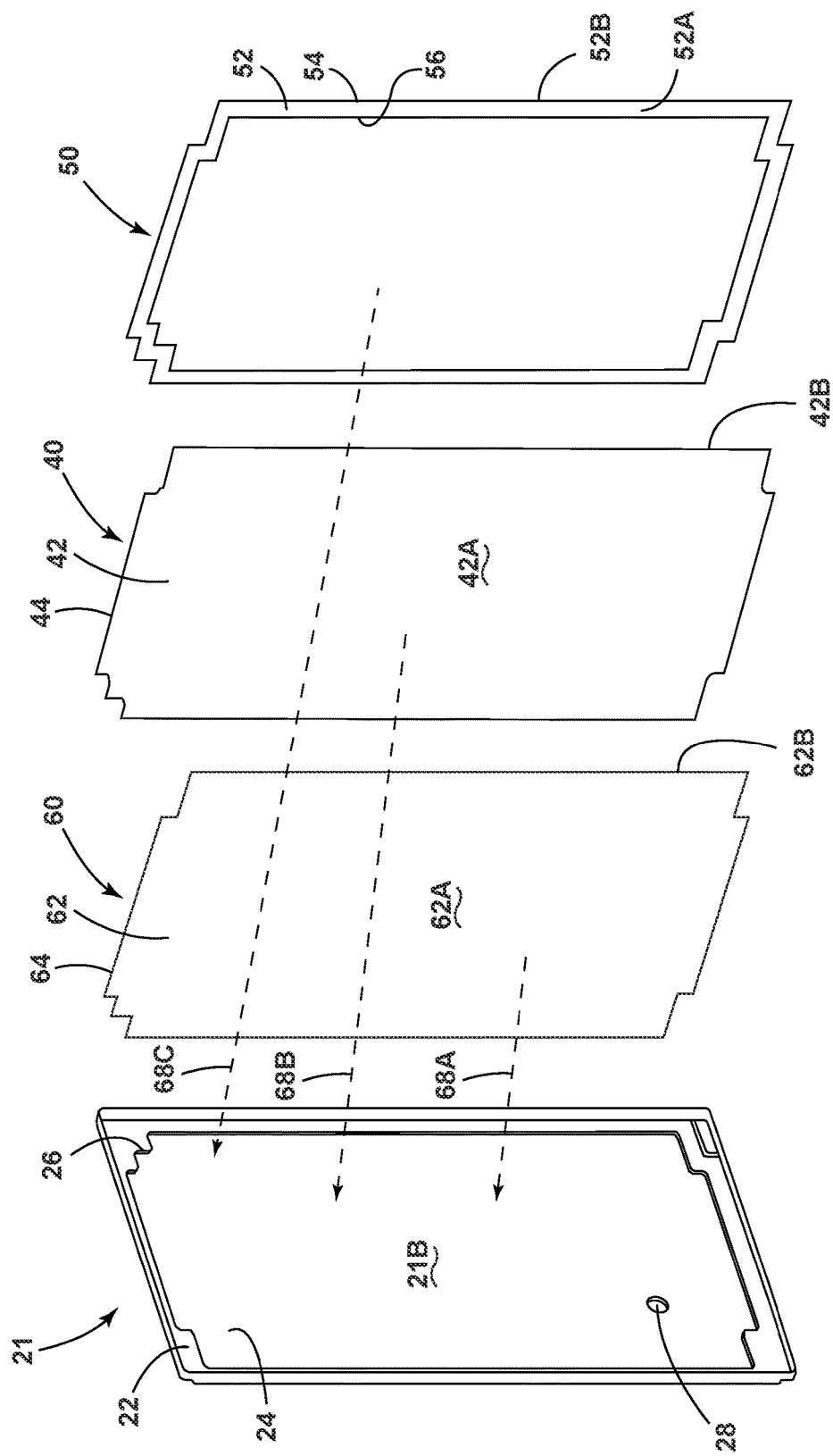
FIG. 3A is a is a top perspective view of a panel having a first filter member, a second filter member and an adhesive member exploded away from an inner surface of the panel.

Referring now to FIG. 3A, the panel 21 is again shown in the same form as described above with reference to FIG. 2A using like reference numerals to identify common features. In FIG. 3A, the panel 21 includes an access aperture 28 disposed therethrough for filling a vacuum cavity of a vacuum insulated structure as best shown in FIG. 5. As noted above, the panel 21 is contemplated to be comprised of a metal material, such as a stamped sheet metal.

As further shown in FIG. 3A, a first filter member 60 is shown having a body portion 62 having first and second sides 62A, 62B with an outer perimeter edge 64. The first filter member 60 is shown in FIG. 2A as exploded away from the inner surface 21B of the panel 21, however, it is contemplated that the first filter member 60 is affixed to the inner surface 21B of the panel 21 in assembly, as indicated by arrow 68A, and is sized appropriately to substantially cover the inner surface 21B and the access aperture 28 of the panel 21. The first filter member 60 is contemplated to be comprised of a paper material which is configured to allow for the passage of air drawn from a vacuum cavity 72 (FIG. 5) through the first filter member 60. Thus, the paper material of the first filter member 60 may be a polyester-based filter paper material that is porous to allow for air to be drawn therethrough, much like the filter paper material of filter member 40 described above. The first filter member 60 is contemplated to be affixed directly to the inner surface 21B of the panel 21 at the first side 62A of the first filter member 60 and is further contemplated to substantially cover the area defined by the inner surface 21B of the panel 21. The first filter member 60 can be affixed to the inner surface 21B of the panel 21 by an adhesive member, much like adhesive member 50 described above, to hold the first filter member 60 in place until the first filter member 60 can be covered by a second filter member 40, as further described below.

Figure 3B:
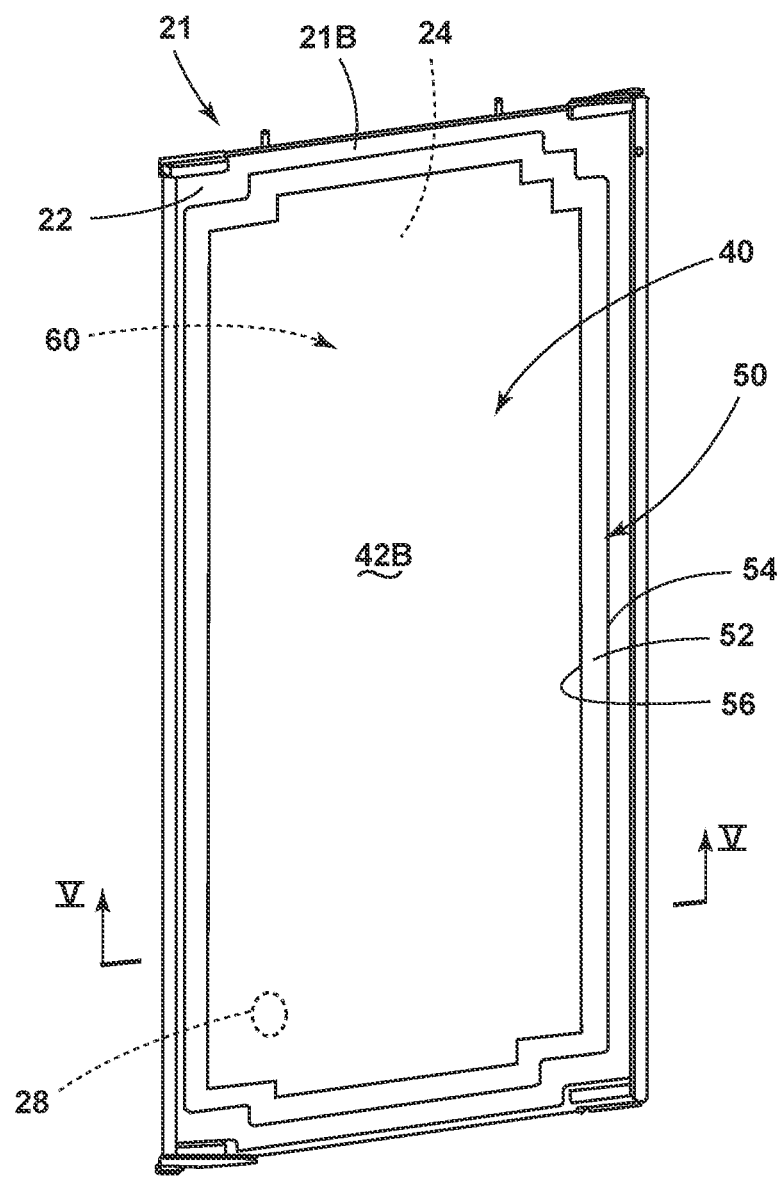
FIG. 3B is a rear perspective view of the panel of FIG. 3A having the first filter member coupled to the inner surface of the panel, with the second filter member also coupled thereto by the adhesive member.

As further shown in FIG. 3A, a second filter member 40 is shown and is contemplated to be the same filter member as filter member 40 described above. In the embodiment of FIG. 2, the second filter member 40 is identified as the "second" filter member given the application of a first filter member 60 to the inner surface 21B of the panel 21. Accordingly, the second filter member 40 is shown in FIG. 3A as being exploded away from the inner surface 21B of the panel 21, however, it is contemplated that the second filter member 40 is affixed to the inner surface 21B of the panel 21 in assembly, and is sized appropriately to substantially cover the inner surface 21B and the access aperture 28 of the panel 21, as well as the first filter member in assembly. As noted, the paper material of the second filter member 40 may be a polyester-based filter paper material that is porous to allow for air to be drawn therethrough, but is contemplated to include properly sized pores, such that the second filter member 40 acts as a filter to prevent the insulation material 74 (FIG. 5) disposed within the vacuum cavity 72 (FIG. 5) from passing through the second filter member 40 during an evacuation procedure. Being sized to cover the entirety of the first filter member 60, the second filter member 40 substantially covers the inner surface 21B of the panel 21 in assembly, as shown in FIG. 3B. The second filter member 40 is contemplated to be applied to the inner surface 21B of the panel 21 over the first filter member 60 as indicated by arrow 68B. After covering the first filter member 60, the second filter member 40 is contemplated to be affixed to the inner surface 21B of the panel 21 by the adhesive member 50 in a manner as described above with reference to FIGS. 2A and 2B.

With specific reference to FIG. 3B, the panel 21 of FIG. 3A is shown in an assembled condition. With reference to FIGS. 3A and 3B, when assembling the components of the panel 21, the first side 62A (FIG. 3A) of the first filter member 60 is positioned on the inner surface 21B of the panel 21 in a manner as indicated by arrow 68A. The first filter member 60 can then be adhered to the inner surface 21B of the panel 21 by taping portions of the first filter member 60 to the inner surface 21B of the panel 21. In coupling the first filter member 60 to the inner surface 21B of the panel 21, the first filter member 60 will fully cover the access aperture 28 of the panel 21. With the first filter member 60 in place on the inner surface 21B of the panel 21, the second filter member 40 will be placed over the first filter member 60 along the path as indicated by arrow 68B, such that the first side 42A of the second filter member 40 contacts and covers the second side 62B of the first filter member 60. As noted above, the second filter member 40 completely covers the first filter member 60 in assembly. Once the second filter member 40 is in place on the first filter member 60, the second filter member 40 is retained in place by the adhesive member 50 as shown in the direction indicated by arrow 68C. Specifically, the first side 52A of the adhesive member 50 will coupled to the second side 42B of the second filter member 40. With the second filter member 40 coupled to the inner surface 21B of the panel 21, the panel 21 is fully assembled as shown in FIG. 3B and ready for incorporation into a vacuum insulated structure.

Referring now to FIG. 4, the panel 21 of FIG. 2B is shown coupled to a second panel 70 by an interconnecting trim breaker 80. As such, the panel 21 may be designated as a first panel in the overall configuration of a vacuum insulated structure 82. With the second panel 70 coupled to the panel 21 via the trim breaker 80, the vacuum insulated structure 82 is formed having a vacuum cavity 72. The vacuum cavity 72 is configured to hold a negative air pressure therein, such that the first panel 21 is contemplated to be coupled to the second panel 70 in a substantially air-tight manner. As noted above, panel 21 is contemplated to be a stamped metal material. Similarly, the second panel 70 is contemplated to be a stamped metal material having outer and inner surfaces 70A, 70B. In FIG. 4, the metal panels 21, 71 are shown to be interconnected by a trim breaker 80 that is contemplated to be comprised of a polymeric material. As coupled to one another, the panels 21, 70 define the vacuum cavity 72 therebetween. The vacuum cavity 72 is filled with an insulation material 74 which may be a powder insulation introduced into the vacuum cavity 72 via an access aperture.

In the cross-sectional view of FIG. 4, a portion of the vacuum insulated structure 82 is shown, wherein the trim breaker 80 interconnects the panel 21 (which may be an outer wrapper) with the second panel 70 (which may be in inner liner) in an air-tight manner to define the vacuum cavity 72 therebetween. A vacuum port 76 is shown disposed on the panel 21 at the access aperture 28 thereof, such that the vacuum port 76 is fluidically coupled to the vacuum cavity 72 through the access aperture 28. As further shown in FIG. 4, the mesh member 30 covers the inner surface 21B of the panel 21, and the filter member 40 covers the mesh member 30. Thus, in the cross-sectional view of FIG. 4, the mesh member 30 and the filter member 40 completely cover the access aperture 28 and the vacuum port 76 of the panel 21. As noted above, the filter member 40 substantially covers the mesh member 30, such that the filter member 40 and the mesh member 30 cooperate to define a channel 84 therebetween having a width 86 as shown in FIG. 4. The width 86 of the channel 84 is commensurate with the girth or width of the strands 36 of the mesh member 30. As noted above, the strands 36 of the mesh member 30 include first and second surfaces 30A, 30B. Together, first and second surfaces 30A, 30B of the mesh member 30 define an overall width of the mesh member 30. The width the mesh member 30 further defines the width 86 of the channel 84 as the mesh member 30 acts as a stand-off feature to the inner surface 21B of the panel 21. With the both the mesh member 30 and the filter member 40 covering the area defined by the inner surface 21B of the panel 21, and having the channel 84 defined between the mesh member 30 and the filter member 40, the channel 84 includes an area that is commensurate with the area defined by the inner surface 21B of the panel 21. With the interconnecting strands 36 of the mesh member 30, the channel can be said to having a plurality of apertures defined by the interconnected strands 36 as shown in FIG. 2A. The vacuum port 76 of the first panel 21 is fluidically coupled to the vacuum cavity 72 through the channel 84 defined between the mesh member 30 and the filter member 40.

During an evacuation procedure of the vacuum insulated structure 82, air is drawn through the vacuum port 76 along the path as indicated by arrow 78 from the vacuum cavity 72. As noted above, the vacuum cavity 72 is filled with an insulation material 74 for providing an insulating barrier. Without the filter member 40, the insulation material 74 would be drawn through the vacuum port 76 during the evacuation procedure. As such, the filter member 40, by covering the vacuum port 76, provides a filter to keep the insulation material 74 within the vacuum cavity 72 as air within the vacuum cavity 72 is evacuated. Further, by having the mesh member 30 positioned between the panel 21 and the filter member 40, the channel 84 created therebetween is spread substantially over the entirety of the inner surface 21B of the panel 21. In this way, the channel 84 created between the mesh member 30 and the filter member 40 provides for a much larger surface area from which air can be drawn from the vacuum cavity 72 as compared to a vacuum being drawn from a single evacuation port.

As further shown in FIG. 4, the adhesive member 50 includes portions 54 and 56 which are coupled to and interconnect the inner surface 21B of the panel 21 and the second side 42B of the filter member 40, respectively. It is contemplated that the adhesive member 50 may include a one-sided tape material used to hold both the filter member 40 and the mesh member 30 in place on the panel 21.

Referring now to FIG. 5, the panel 21 of FIG. 3B is shown coupled to a second panel 70 by the interconnecting trim breaker 80. In a manner similar to that described above with reference to FIG. 5, having the second panel 70 coupled to the panel 21 via the trim breaker 80, a vacuum insulated structure 82 is formed having a vacuum cavity 72.

In the cross-sectional view of FIG. 5, a portion of the vacuum insulated structure 82 is shown, wherein the trim breaker 80 interconnects the panel 21 (which may be an outer wrapper) with the second panel 70 (which may be in inner liner) in an air-tight manner to define the vacuum cavity 72 therebetween. Again, a vacuum port 76 is shown disposed on the panel 21 at the access aperture 28 thereof. As further shown in FIG. 5, the first filter member 60 substantially covers the inner surface 21B of the panel 21. Further, the second filter member 40 covers the first filter member 60. Thus, in the cross-sectional view of FIG. 5, the first filter member 60 and the second filter member 40 both completely cover the access aperture 28 and the vacuum port 76 of the panel 21. With the second filter member 40 substantially covering the first filter member 60, the first filter member 60 and the second filter member 40 cooperate to define a channel 84 therebetween having a width 86 as shown in FIG. 5. The width 86 of the channel 84 is commensurate with a width of the first filter member 60 that is covered by the second filter member 40. With the both the first filter member 60 and the second filter member 40 covering the area defined by the inner surface 21B of the panel 21, and having the channel 84 defined between the first filter member 60 and the second filter member 40, the channel 84 includes an area that is commensurate with the area defined by the inner surface 21B of the panel 21. The vacuum port 76 of the first panel 21 is fluidically coupled to the vacuum cavity 72 through the channel 84 defined between the first filter member 60 and the second filter member 40.

In a manner similar to the evacuation procedure described above with reference to FIG. 4, an evacuation procedure performed on the vacuum insulated structure 82 of FIG. 5 includes air being drawn through the vacuum port 76 along the path as indicated by arrow 78. The air being drawn from the vacuum port 76 is air disposed within the vacuum cavity 72 and within the insulation material 74 disposed therein. Both the second filter member 40, that is in contact with the insulation material 74, and the first filter member 60 provide a filtration barrier to keep the insulation material 74 within the vacuum cavity 72 as air within the vacuum cavity 72 is drawn out during an evacuation procedure. Further, by having the first filter member 60 positioned between the panel 21 and the second filter member 40, the channel 84 created therebetween is spread substantially over the entirety of the inner surface 21B of the panel 21. In this way, the channel 84 created between the mesh member 30 and the filter member 40 provides for a much larger surface area from which air can be drawn from the vacuum cavity 72 as compared to a vacuum being drawn from a single evacuation port.

A vacuum insulated structure, such as vacuum insulated structure 82 described above with reference to FIGS. 4 and 5, has very low heat gain due to the presence of a vacuum inside a highly porous structure reducing the heat transfer through gas conduction, convection and radiation. This vacuum is created by drawing the air inside the vacuum insulated structure 82 using pumps coupled to the vacuum port 76 of the vacuum insulated structure 82. The process of removing air inside the vacuum cavity 72 to create a vacuum therein is time intensive. For example, a simple rectangular panel structure having the following dimensions (1 m long×1 m wide×0.05 m thick) can take around 4 days for a sufficient evacuation at a single vacuum port. The present concept helps to greatly reduce evacuation time by allowing air to be drawn along the channel 84 shown in FIGS. 4 and 5, as compared to a single aperture at a vacuum port location. This particular concept provides a design to reduce air travel distance during an evacuation procedure, which reduces the overall evacuation time. The present configurations shown in FIGS. 4 and 5 allows for air to pass through the outer filter member 40 from the vacuum cavity 72 and into the channel 84 disposed between filter member 40 and the mesh member 30 (FIG. 4), or the first filter member 60 and the second filter member 40 (FIG. 5). As the channel 84 is disposed between the entirety of the inner surface 21B of the panel 21 and an interfacing surface between the insulation material 74 with the second filter member 40, air disposed within the insulation material 74 and within the vacuum cavity 72 has a short distance to travel to reach the vacuum port 76 along an uninterrupted channel 84 directly through the first and second filter members 60, 40, as opposed to a single aperture vacuum port system. It is contemplated that the vacuum insulated structure 82 of FIGS. 4 and 5 can include an air pressure level of less than about 1 atm, about 0.5 atm, about 0.4 atm, about 0.3 atm, about 0.2 atm, about 0.1 atm, about 0.01 atm, or less than about 0.001 atm (1 mbar) after a vacuum is drawn through the channel 84 during an evacuation procedure. Using either configuration shown in FIGS. 4 and 5, is contemplated that such a vacuum can be drawn in a vacuum insulated structure 82 in approximately one hour.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A vacuum insulated structure, comprising:
   a first panel having an inner surface, wherein the first panel includes a vacuum port;
   a second panel;
   a trim breaker interconnecting the first and second panels in an air-tight manner to define a vacuum cavity therebetween;
   a first filter member disposed on and substantially covering the inner surface of the first panel and the vacuum port; and
   a second filter member substantially covering the first filter member to define a channel therebetween, wherein the channel includes an area commensurate with the inner surface of the first panel.

2. The vacuum insulated structure of claim 1, wherein the vacuum port is fluidically coupled to the channel.

3. The vacuum insulated structure of claim 2, wherein the first and second filter members are comprised of a filter paper material.

4. The vacuum insulated structure of claim 1, including:
   an adhesive member interconnecting the second filter member and the inner surface of the first panel.

5. The vacuum insulated structure of claim 4, wherein the adhesive member includes a frame assembly that surrounds an outer perimeter edge of the second filter member, such that a first portion of the frame assembly of the adhesive member is coupled to the inner surface of the panel and a second portion of the frame assembly of the adhesive member is coupled to the outer perimeter edge of the second filter member.

6. The vacuum insulated structure of claim 1, wherein the first and second panels are formed from a metal material.

7. The vacuum insulated structure of claim 1, including:
an insulation material disposed in the vacuum cavity between the first and second panels.

* * * * *